US008750121B2

(12) United States Patent
Allan

(10) Patent No.: US 8,750,121 B2
(45) Date of Patent: Jun. 10, 2014

(54) ADDRESSING THE LARGE FLOW PROBLEM FOR EQUAL COST MULTI-PATH IN THE DATACENTER

(75) Inventor: David Ian Allan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 217 days.

(21) Appl. No.: 13/284,292

(22) Filed: Oct. 28, 2011

(65) Prior Publication Data

US 2013/0107712 A1    May 2, 2013

(51) Int. Cl.
*G01R 31/08* (2006.01)

(52) U.S. Cl.
USPC ........................................... 370/235; 370/252

(58) Field of Classification Search
None
See application file for complete search history.

(56) References Cited

U.S. PATENT DOCUMENTS

| 6,954,435 | B2 * | 10/2005 | Billhartz et al. ............. 370/252 |
| 8,447,875 | B2 * | 5/2013 | Liu et al. ....................... 709/231 |
| 2008/0253290 | A1 | 10/2008 | Schollmeier et al. | |
| 2010/0165881 | A1 | 7/2010 | Hof et al. | |
| 2013/0107712 | A1 * | 5/2013 | Allan ............................ 370/235 |

FOREIGN PATENT DOCUMENTS

| CN | 102143041 (A) | 8/2011 |
| EP | 2512077 (A1) | 10/2012 |

OTHER PUBLICATIONS

Ben Mack-Crane, "802.1Qbp—ECMP Editor's Notes and Issues," Sep. 21, 2011, 5 pages.
Ben Mack-Crane, "802.1Qbp—ECMP Multicast Load Spreading," Sep. 17, 2011, 19 pages.
Ben Mack-Crane, "Single VID ECMP Frame Format Considerations," Jul. 19, 2011, 15 pages.
Dave Thaler et al., "Multipath Issues in Unicast and Multicast Next-Hop Selection," Network Working Group, Request for Comments: 2991, Nov. 2000, 9 pages, The Internet Society.
Lee, Scott S., et al., "A Hierarchical Multipath Approach to QoS Routing: Performance and Cost Evaluation", 2003, 6 pages, IEEE.

\* cited by examiner

*Primary Examiner* — Robert Wilson
(74) *Attorney, Agent, or Firm* — Blakely Sokoloff Taylor & Zafman LLP

(57) ABSTRACT

Method and apparatus for performing load spreading in a network are described. According to one embodiment, a request to allocate network resources for a flow is received from a load distribution module in an edge network element. The request includes a resource requirement for the flow. A path is selected from the currently available equal cost paths, and a path identifier value that represents the path selected is determined. The path identifier value is used by the nodes in the network to correctly perform multipath forwarding for the flow. The path identifier value that represents the path selected is communicated to the load distribution module in the edge network element, and is to be inserted by the edge network element into subsequent frames belonging to the flow to be used in subsequent forwarding decisions by nodes along the path selected.

24 Claims, 7 Drawing Sheets

ADDRESSING THE LARGE FLOW PROBLEM FOR EQUAL COST MULTI-PATH IN THE DATACENTER

FIELD

Embodiments of the invention relate to a method and apparatus for improving load distribution in a network. Specifically, embodiments of the invention relate to a method for load spreading of flows in a network that has multiple equal cost paths between nodes in the network.

BACKGROUND

Load distribution or load spreading is a method by which network resources such as bandwidth are more effectively utilized and overall performance is improved in a network. Most automated load distribution and load spreading techniques deployed today operate with only a very local view. These load distribution and load spreading techniques only consider the number of next hops on the shortest path to a given destination and do not consider the overall distribution of traffic in the network.

Equal cost multi-path (ECMP) is a common strategy for load spreading of unicast traffic in routed networks that can be utilized where the decision as to how to forward a packet to a given destination can resolve to any of multiple "equal cost" next hops, which tied for being on the shortest path when running database calculations. ECMP can be used in conjunction with most unicast routing protocols and nodes equipped with the required supporting data plane hardware. It relies on a per hop decision that is local to a single router and assumes a complete forwarding table at every intermediate node. Using ECMP at any given node in a network, the load is divided pseudo-evenly across the set of equal cost next hops. This process is implemented independently at each hop of the network where more than one path to a given destination exists.

SUMMARY

According to one embodiment of the invention, a method in the network resource arbiter for improving load spreading in a network having a set of nodes and links connecting the nodes to form a network topology includes the step of receiving, from a load distribution module in an edge network element, a request to allocate network resources for a flow between a given source node and a given destination node. The request includes a resource requirement for the flow. The network resource arbiter includes a path selection module to compute a set of currently available equal cost paths between nodes in a network based on the network topology of the network, a set of per-link network resource utilization indications, and a set of equal cost load spreading algorithms used at each of the nodes to determine path identifiers. The method in the network resource arbiter further includes the steps of selecting a path from the currently available equal cost paths between the given source node and the given destination node that has sufficient available resources to satisfy the resource requirement of the flow, and determining a path identifier value that represents the path selected to be used by the nodes in the network to correctly perform multipath forwarding for the flow. The path identifier value that represents the path selected is communicated to the load distribution module. The path identifier value is to be inserted by the edge network element into subsequent frames belonging to the flow to be used in subsequent forwarding decisions to be made by nodes along the path selected.

According to another embodiment of the invention, a method in the edge network element for load spreading in a network includes the steps of receiving a request to allocate network resources for a flow and flow classification information associated with the flow, and communicating the request including a resource requirement for the flow to a network resource arbiter. The edge network element includes a load distribution module with a default operation mode of load spreading that distributes load using an algorithmically generated path identifier value computed from frame header information. The method further includes the steps of receiving, from the network resource arbiter, an override path identifier value to identify an equal cost path to be used by the flow, and in response to receiving the override path identifier value, configuring the load distribution module to override its default operation mode of load spreading and to assign, to frames with classification information matching the flow classification information, the override path identifier value received from the network resource arbiter instead of the algorithmically generated path identifier value. When frames belonging to the flow with matching classification information are received, the override path identifier value received from the network resource arbiter is into these frames belonging to the flow. The frames belonging to the flow are then forwarded onto the equal cost path identified by the override path identifier value received from the network resource arbiter.

According to a further embodiment of the invention, a network resource arbiter for arbitrating network resources in a network having a set of nodes and links connecting the nodes in a network topology of the network includes a topology database, a load spreading algorithm database, and a path selection module. The topology database is configured to store the network topology of the network and a set of per-link network resource utilization indications for each of the links in the network, wherein each of the per-link network resource utilization indications include an unallocated resource value for each link. The load spreading algorithm database is configured to store a set of equal cost load spreading algorithms that are used at each node. The path selection module is coupled to the topology database and the load spreading algorithm database, and is configured to compute a set of currently available equal cost paths between the nodes in the network based on the network topology, the set of per-link network resource utilization indications, and the set of equal cost load spreading algorithms. The path selection module is further configured to select, in response to a request to allocate network resources for a flow, a path from the set of currently available equal cost paths that has sufficient available resources to satisfy a resource requirement of the flow, and to determine an override path identifier value that represents the path selected. The override path identifier value is to be inserted into frames belonging to the flow to be used in subsequent forwarding decisions to be made by nodes along the path selected.

According to another embodiment of the invention, an edge network element includes a load distribution module and a forwarding module. The load distribution module includes a path identifier generator and a flow filter. The path identifier generator is configured to algorithmically compute a path identifier value from frame header information of received frames. The flow filter is configured to select, as a frame path identifier value, between the algorithmically computed path identifier value generated by the path identifier generator, and an override path identifier value received from a network resource arbiter that identifies an equal cost path to be used by a flow, and to insert the frame path identifier value selected into the received frames. The forwarding module is configured to forward the received frames based on the frame path identifier value selected.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
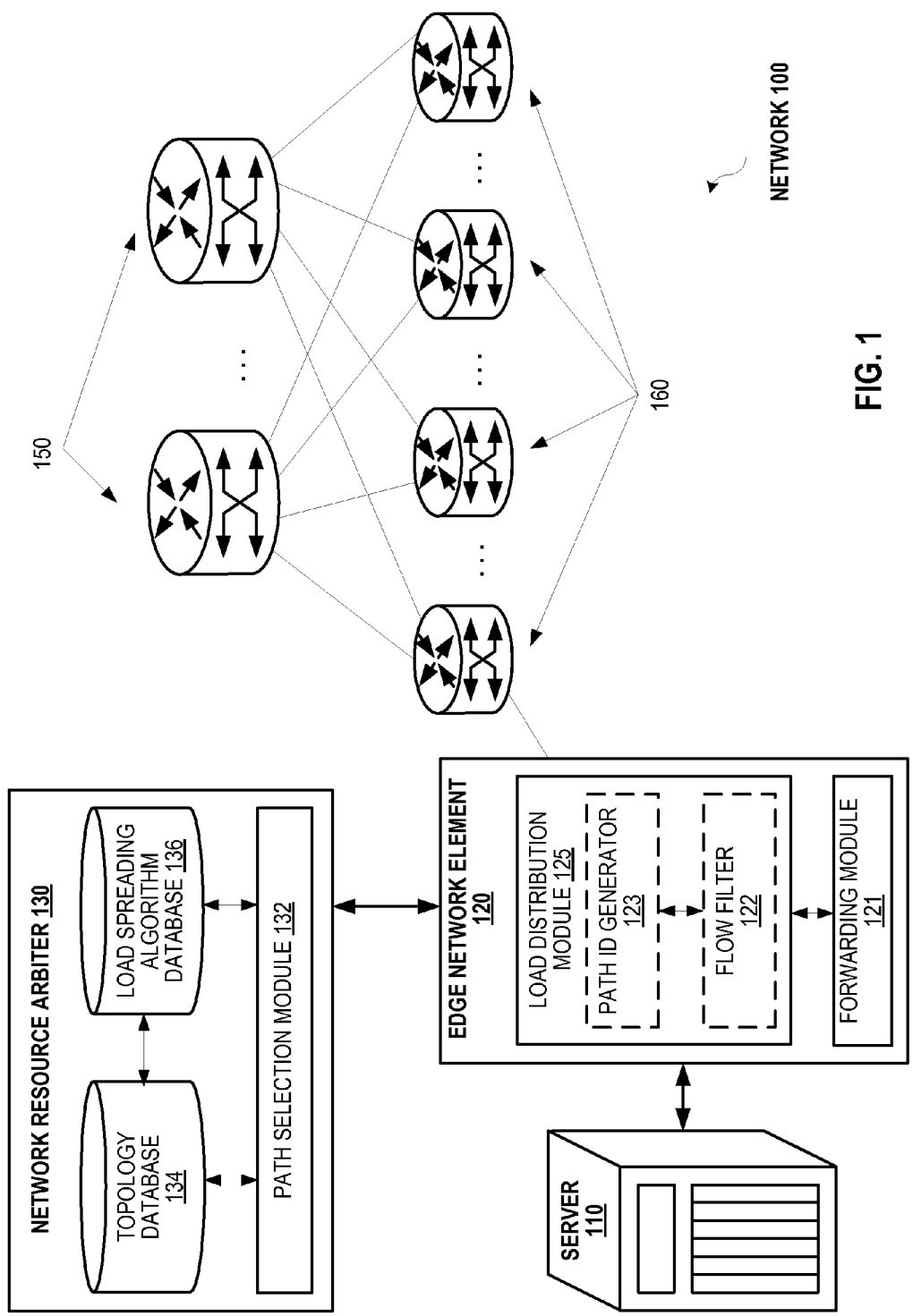
FIG. 1 illustrates a diagram of an exemplary network with an edge network element according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

For technologies for which distinct paths can be identified end to end, such as with an Ethernet VLAN tag, it is also possible to consider edge based assignment of flows to a path. The flow assignment process involves an inspection of the packet for information that would allow a flow (a set of packets that require in-order delivery) to be identified and results in a pseudo-random assignment of flows along paths in the network. This process may be performed at every hop, but may also be performed at the edge of the network and results in a digest of the flow information or a tag representative of the flow being embedded in the packet header of packets belonging to the flow.

One approach to load distribution of flows in a network uses a path identifier (ID) generated by an edge network element at an edge node of the network, and embeds the path ID in the frame header of frames belonging to a flow in order to expose the path ID to intermediate nodes. This reduces the frame processing required at intermediate nodes by allowing the intermediate nodes to use the path ID in the frame header of received frames as an input to a local load spreading function to properly forward the frames along the flow path. The path ID is typically assigned based on snooping or inspection of the frame header at the edge network element, and can be generated from a hash of the frame header information. The format of the path ID should be large enough (e.g., contain enough bits) to be able to accommodate one or more path IDs to uniquely identify every possible path permutations through the network. Hence, if there are $2^N$ possible paths in a network, a path ID format of N bits can be used. For example, a path ID format of 16 bits can be used for networks having no more than 65,536 possible paths. In larger networks, more bits can be used in order to accommodate the set of possible paths in the network.

It is also possible to envision multiple ways in which the path identifier can be processed by intermediate nodes in the network. In a classic hop-by-hop ECMP, the path identifier may be algorithmically processed in order to perform a next hop selection from the set of equal cost next hops. In a path oriented system, the egress interface for the path ID may have been pre-selected by the routing system.

In a datacenter, clusters of thousands to tens of thousands of machines are interconnected with each other through aggregate switches and core switches with many equal cost paths among nodes. Network flows in a datacenter network tend to be either small (a few megabytes), or large (100 megabytes to multi-gigabytes and beyond). Some examples of large flows include distributed file system transactions, content streams, and virtual machine migrations. Small flows typically correspond to customer transactions, and algorithmic load distribution of the small flows to spread them among equal cost paths tends to be effective in minimizing the impact of the traffic load of even a large number of small flows on the overall network resources of a datacenter. Although ECMP load distribution using local load spreading functions at each intermediate node can be effective for small flows, when ECMP load distribution is used for spreading loads with large flows, multiple large flows may transit the same link and cause network congestion. This can happen because ECMP load distribution does not take into account whether a flow is small or large, and whether a flow will be sustained on a link for a long period of time. Thus, it is possible for an edge node to assign path IDs corresponding to paths that share one or more links to flows without regard to the size of the flows or awareness of flows entering the network from other edge nodes that will transit common facilities. If the paths of multiple large flows assigned by multiple edge nodes have one or more links in common, network congestion can occur as a result of collisions of the large flows on those common shared links.

The embodiments of the present invention provide a method and apparatus to avoid such collisions of large flows in a network by using a network resource arbiter to arbitrate network resources such as bandwidth among different flows. The network resource arbiter does so by overriding the path identifier assignment of a new flow if the particular path identifier assignment will cause congestion on one or more links in the network, as determined by the sum of resource requirements of the new flow and the a priori flows exceeding the link capacity. FIG. 1 illustrates a diagram of an exemplary network 100 with an edge network element 120 as an edge node of the network 100 according to an embodiment of the present invention. The network 100 can be a network for a datacenter and can have a network topology in the form of a hierarchal multi-rooted tree structure as shown. In other embodiments, the network topology of the network 100 can take the form of other network structures. The network 100 is made of a set of nodes and links connecting the nodes in the network topology. For example, the network 100 can have aggregate switches 160 that connect to the edges of the network 100 to aggregate traffic going into or coming from the network 100 to the outside. The network 100 can also have core switches 150 that connect to the aggregate switches 160 to aggregate the traffic of the aggregate switches 160. In other embodiments, the network 100 may have other types of network elements, for example, other routers and other switches. A server 110 and a network resource arbiter are communicatively coupled to the edge network element 120. While only one edge network element 120 and only one server 110 coupled to the edge network element 120 are shown, it should be understood that there can be more than one edge network element in the network 100 and more than one server or other hosts, clients, and machines coupled to any of the edge network elements that may be part of network 100.

According to one embodiment of the present invention, the edge network element 120 includes a load distribution module 125 and a forwarding module 121. The load distribution module 125 includes a path identifier (ID) generator 123 and a flow filter 122. The path ID generator 123 is configured to algorithmically compute a path ID value from frame header information of received frames. The path ID value is normally used to identify a flow, but can also be used to identify a specific path in the network, and if applied to a flow by the edge network element 120, the path ID value enables intermediate nodes that are capable of multipath forwarding in the network to correctly make forwarding decisions to direct frames belonging to the flow onto the specific path as identified by the path ID value. The path ID value can be algorithmically computed using a hash of selected frame header information such as flow parameters in the frame header. The flow parameters can be the source and destination addresses of the flow and the port number corresponding to a particular protocol used by the flow. Some specific examples of a path ID value are a flow ID such as an Internet Protocol version 6 (IPv6) flow ID, an entropy label such as a Multi-Protocol Label Switching (MPLS) entropy label, a multi-topology identifier such as a Shortest Path Bridging VLAN ID (SPVID) or Shortest Path Bridging MAC (SPBM) bridge VID (B-VID), or other encoded multipath identifiers in a frame.

In a default mode of operation, the flow filter 122 distributes load in the network 100 by inserting the algorithmically generated path ID value computed from frame header information by the path ID generator 123 into received frames belonging to the flow. The path ID value is hence explicitly exposed in the frame header. The forwarding module 121 then forwards the received frames to the next hop based on the path ID value inserted into the frames. Upon receiving these frames, the intermediate nodes of the network 100, such as the aggregate switches 160 and core switches 150, will make their forwarding decisions based on destination information encoded in the frame and in presence of multiple equal cost paths will also incorporate the path ID value in the next hop selection process. By explicitly exposing the path ID value in the frame header, the amount of frame processing required at the intermediate nodes to perform multipath forwarding is reduced.

Pseudo-random and uncoordinated algorithmic assignment of path identifier values as a default behavior in a network with multipath forwarding laid out in advance (as would be the case in a converged routed network) will work well for short duration, transactional flows, but such pseudo-random assignment does not ensure that large flows will not collide. In a typical network, there are frequently a large number of short, transactional flows and a relatively smaller number of large flows. Because of the relatively small number of large flows expected in a network, special treatment can be given to the flow assignment of large flows that deviates from the default pseudo-random assignment and still be manageable.

In order to avoid assigning multiple large flows to paths that share a common link, the flow filter 122 does not insert the algorithmically computed path ID value for all flows. Rather, the default mode of operation described above can be overridden in response to receiving a request, for example, from an application running on server 110, to allocate network resources for a pending flow. In addition to sending the request, the server 110 also sends flow classification information associated with the flow including the source and destination of the flow to allow the edge network element 120 to identify frames belonging to the flow. When the load distribution module 125 in the edge network element 120 receives a request to allocate network resources for a pending flow including a resource requirement for that flow such as a bandwidth requirement, the request is communicated to a path selection module 132 in the network resource arbiter 130. Alternatively, the request can be communicated to the network resource arbiter 130 only if the flow classification information associated with the flow that are received along with the request from server 110 indicates that the pending flow is a large flow, such as, for example, a distributed file system transaction, a content stream, or a virtual machine migration.

In response to receiving the request to allocate network resources for a pending flow, the network resource arbiter 130 communicates an override path ID value to the flow filter 122 if there are available network resources to satisfy the request. The flow filter 122 is configured to select, as a frame path ID value, the override path ID value received from the network resource arbiter 130 instead of the algorithmically computed path ID value generated by the path identifier generator 123, if there was a request to allocate network resources for the pending flow. This override path ID value identifies an equal cost path that can be used by the pending flow to avoid possible congestion with other flows. Instead of inserting the algorithmically computed path ID value into frames belonging to the flow corresponding to the request, the selected frame path ID value (i.e. the override path ID value) is inserted. The forwarding module 121 then forwards the received frames for this flow to the next hop based on the combination of destination information and the path ID value inserted into the frames. Upon receiving these frames, the intermediate nodes of the network 100, will make their forwarding decisions based on the destination information and override path ID value in these frames to send the frames onto a path that avoids congestion.

The load distribution module 125 can be configured to send a confirmation to the server 110 to indicate that the network resource arbiter 130 was able to successfully assign a path ID value corresponding to the flow associated with the request. Upon receiving this confirmation, the server 110 can initiate the flow associated with the request. If the network resource arbiter 130 was unable to assign a path ID value for the flow, for example, if there is no path with sufficient resources to accommodate the flow, in some embodiments, the load distribution module 125 can reject the request and send a retry notification to the server 110 such that the server 110 can resend the request at a later time when additional resources may become available. In other embodiments, the server 110 can resend the request if the server 110 does not receive a confirmation from the load distribution module 125 in the edge network element 120 after a certain amount of time.

The components and operations of the network resource arbiter 130 will now be described. According to one embodiment of the present invention, the network resource arbiter 130 includes a topology database 134, a load spreading algorithm database 136, and a path selection module 132. The topology database 134 is used to store the network topology of the network 100 and a set of per-link network resource utilization indications for each of the links in the network 100. The network topology stored in the topology database 134 is a snap shot of all current nodes and links of the network 100 and knowledge of the load spreading algorithms used in the network. Network resource utilization indications can include, for each link, an unallocated resource value, such as an unallocated bandwidth value, specifying the amount of resource on the link that can be assigned to new flows, a resource or bandwidth capacity value specifying the actual amount of resources that a link can carry (i.e., the physical throughout of the link), and whether a link is current being used by a flow and the resource requirements. Hence, the network resource arbiter 130 has knowledge of all links in the network and the paths taken by current flows in the network 100. Congestion on a link can occur when the resource usage of a link exceeds the resource capacity of that link. Thus, in order to avoid the possibility of congestion, the unallocated resource value of a link should be maintained to be above zero. It should be noted, however, that having an unallocated resource value of zero does not necessary mean that the resource capacity of the link is being fully utilized at any given point in time, because resource can be allocated but not used. Other network resource utilization indications may include other items such as the set of available interfaces and ports at each node.

The load spreading algorithm database 136 is used to store a set of equal cost load spreading algorithms that are used at each node in the network 100. At each node in the network 100, an equal cost load spreading algorithm is used by the node to make forwarding decisions. The load spreading algorithm at each node can take as an input, for example, a path ID value, to determine the next hop decision. One example of an equal cost load spreading algorithm is a hash function. The particular equal cost load spreading algorithm at each node can be unique and different from other nodes. Even though each node may use a different equal cost load spreading algorithm, by storing the set of cost load spreading algorithms that are used at each node in the network 100 in the load spreading algorithm database 136, the network resource arbiter 130 has knowledge of how each node performs its load spreading function, and thus the network resource arbiter 130 can model the forwarding decisions that each node would make.

The network resource arbiter 130 further includes a path selection module 132 coupled to the topology database 134 and the load spreading algorithm database 136. The path section module is configured to compute a set of currently available equal cost paths between the nodes in the network 100 for the requested flow based on the current network topology and the set of per-link network resource utilization indications that are stored in the topology database 134, and the set of equal cost load spreading algorithms that are stored in the load spreading algorithm database 136. When the path selection module 132 receives a request to allocate network resources for a flow between a given source node and a given destination node from the load distribution module 125, in response to receiving the request, the path selection module 132 computes and selects a path from the set of currently available equal cost paths that has sufficient available resources to satisfy the resource requirement of the flow. The resource requirement of the flow can be network resources, such as bandwidth, that are required to satisfy the quality-of-service (QoS) requirement of the flow. In some embodiments, the set of paths may have been computed in advance. An equal cost path has sufficient available resources to satisfy the resource requirement of the flow if the unallocated resource value for each of the links in that equal cost path is greater than the resource requirement of the flow. Once such a path has been selected, the path selection module 132 deducts, for each of the links in the path selected, a flow resource value representing the resource requirement of the flow from the unallocated resource value in the topology database 134 corresponding to that link to allocate the resource requirement to the flow. In one embodiment, the path selected is a least used path between the given source node and the given destination node.

The path selection module 132 then determines the path ID value that represents the path selected. This path ID value is an override path ID value that is to be inserted into frames belonging to the flow associated with the request by the load distribution module at the node at the ingress for the flow. This override path ID value is used in subsequent forwarding decisions by nodes along the path selected to correctly forward the frames belonging to the flow according to the path identified by the override path ID value instead of the path identified by the path ID value algorithmically computed by the load distribution module 125. This override path ID value is then communicated to the load distribution module 125 such that the load distribution module 125 can insert this override path ID value into subsequent frames belonging to the flow. In addition to the override path ID value, flow classification information for the flow is also communicated to the load distribution module 125. In an alternative embodiment, in addition to the override path ID value, the path selection module 132 sends sufficient information to allow the load distribution module 125 to correlate the path ID value with flow classification information that were previously retained at the load distribution module 125.

Having allocated the network resources (i.e., the bandwidth requirement of the flow) for the flow associated with the request, a mechanism to release the allocated network resources will now be described. In one embodiment, the unallocated resource value for each of the links in the path selected in the topology database 134, known as a "soft state", is increased by the flow resource value representing the resource requirement of the flow responsive to a time-to-live (TTL) amount of time for the flow expiring. In another embodiment, the unallocated resource value (e.g., unallocated bandwidth value) for each of the links in the path selected in the topology database 134 is increased by the flow resource value representing the resource requirement of the flow responsive to a frame count for the flow reaching a predetermined count value after allocating the resource requirement for the flow. In other embodiments, to account for network latency and to prevent the flow assignment from expiring prematurely, the unallocated resource value for each of the links in the path selected in the topology database 134 is increased after a buffer amount of time has elapsed since either of the events described above have occurred. Alternatively, the unallocated resource value for each of the links in the path selected in the topology database 134 is increased responsive to receiving a request to release network resources for the flow, a technique referred to as a "hard state", which requires the resource allocation to adjacencies between the load spreading module 125 and the network resource arbiter 130 to be modified accordingly as well. The request to release network resources can be sent by the server 110 to the edge network element 120 and communicated to the network resource arbiter 130 once the server 110 becomes aware that the particular data transaction corresponding to the flow has completed.

A similar mechanism is used in the edge network element 120 to reconfigure the flow filter 122 to operate back in the default mode to select the algorithmically computed path ID value generated by the path ID generator 123 as the path ID value to be inserted into received frames. For example, the flow filter 122 can be configured to select the algorithmically computed path ID value generated by the path ID generator 123 after a time-to-live amount of time for the flow has expired or a frame count for the flow has reached a predetermined count value. In another embodiment, the flow filter 122 can be configured to select the algorithmically computed path ID value generated by the path ID generator 123 after a buffer amount of time has elapsed since the time-to-live amount of time for the flow has expired or since the frame count for the flow has reached the predetermined count value. Alternatively, the flow filter 122 is configured to select the algorithmically computed path ID value generated by the path ID generator 123 in response to receiving a request to release network resources for the flow.

Figure 2:
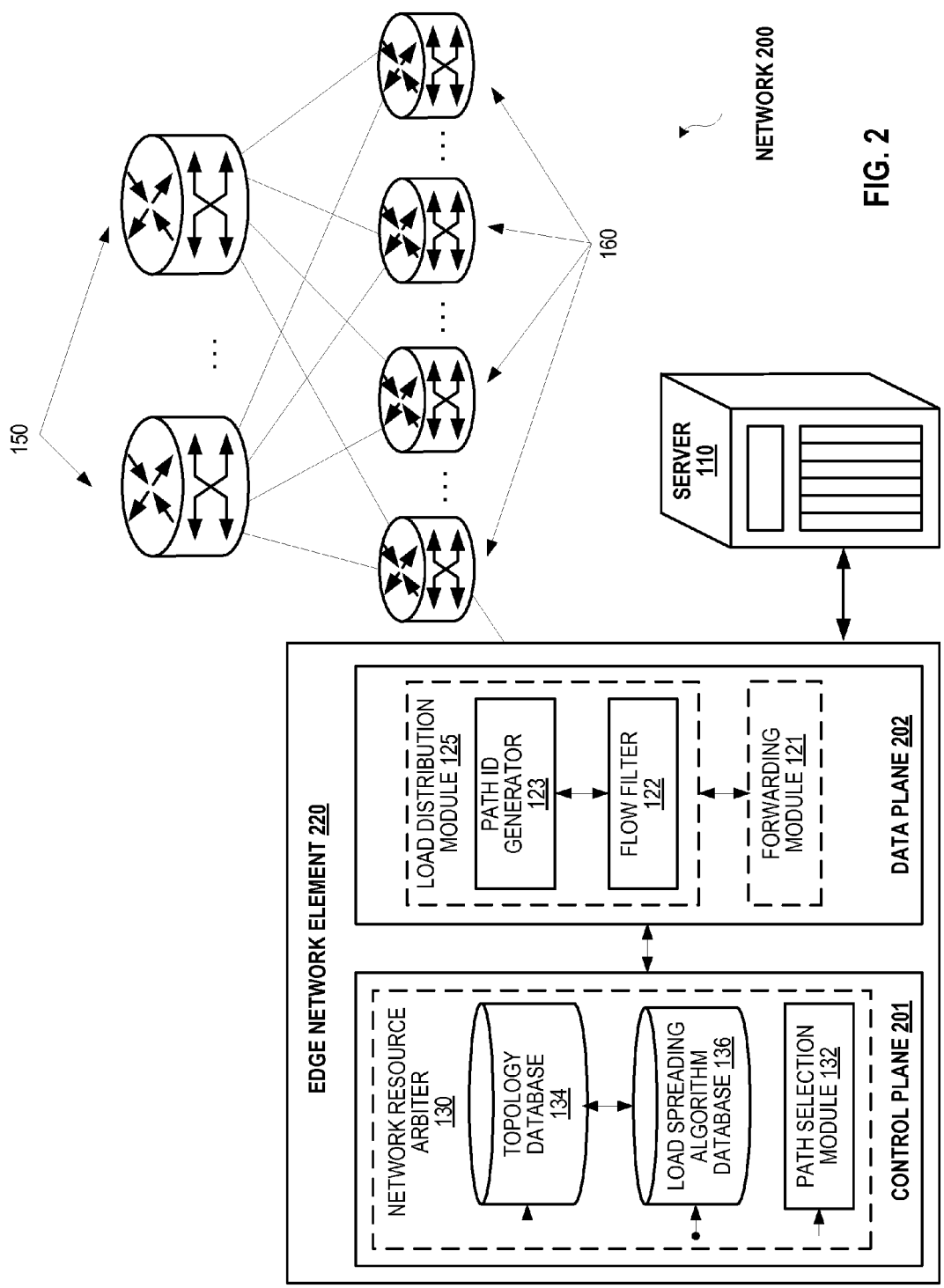
FIG. 2 illustrates a diagram of an exemplary network with an edge network element according to another embodiment of the invention.

Although in the embodiments described above and as shown in FIG. 1, the network resource arbiter 130 is implemented in a separate network element than the edge network element 120, in a different embodiment, the network resource arbiter 130 can be implemented in the same network element 220 as one of the network elements in the network that has a load distribution module 120 and a forwarding module 121 as shown in FIG. 2. The only requirement is that the network element 220 with the network resource arbiter 130 should be able to detect and receive requests from all load distribution modules in the particular network. In this exemplary embodiment, the load distribution module 125 and the forwarding module 121 are implemented in a data plane 202 in the edge network element 220. The network resource arbiter 130 is implemented in a control plane 201 of the same edge network element 220. It should be understood that the network resource arbiter 130 can be implemented in any network element that is part of the network 200 as long as network resource arbiter 130 is able to learn the load spreading algorithms that are used by all nodes in the network 200 and have access without race condition to all resource requests from the entire set of load distribution modules in the network. The operations of the components in the edge network element 220 are similar to those described above and hence need not be repeated here.

Figure 3:
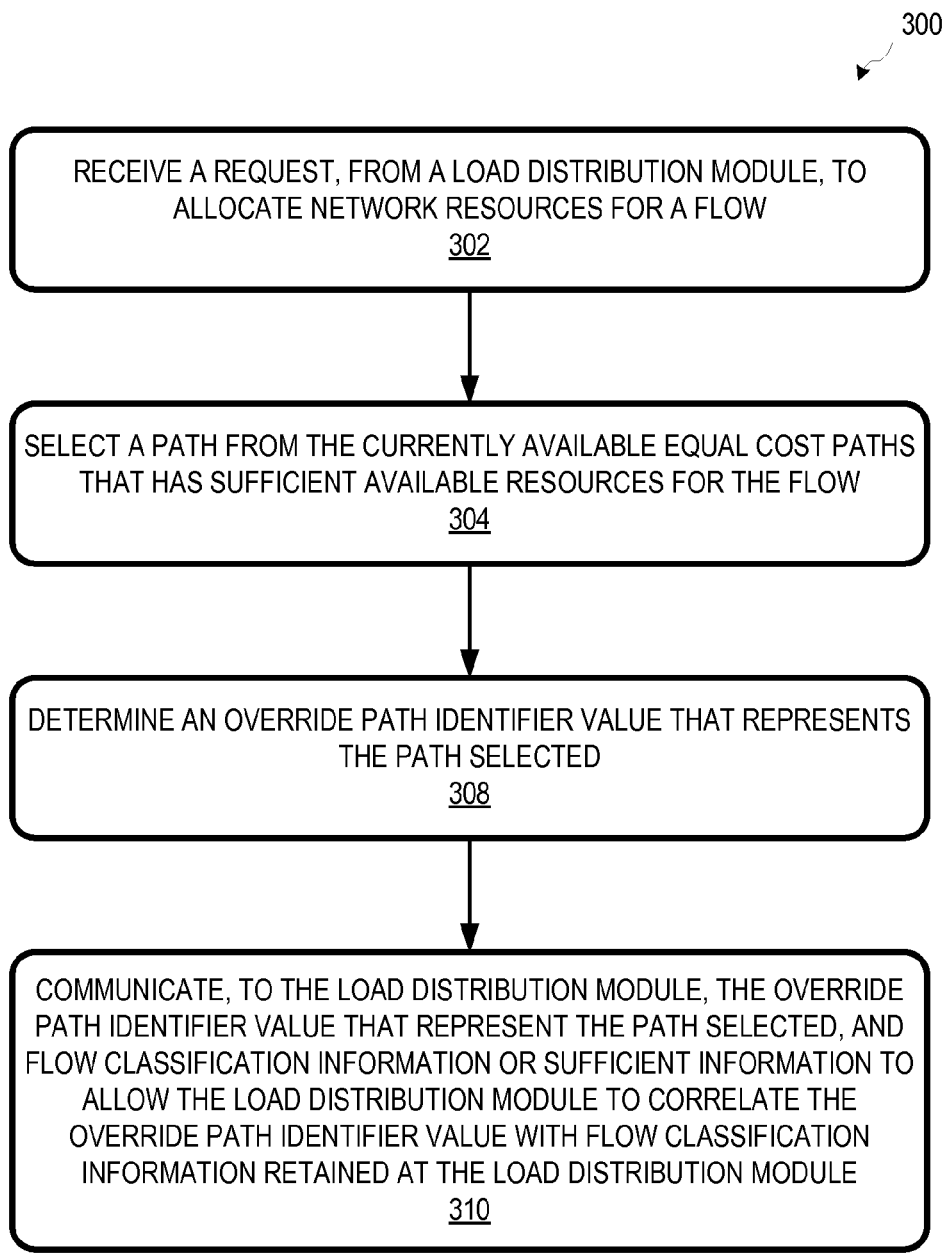
FIG. 3 illustrates a flow diagram of a method in a network resource arbiter for load spreading according to one embodiment of the present invention.

FIG. 3 illustrates a method 300 in a network resource arbiter for load spreading in a network according to one embodiment of the present invention. The network has a set of nodes and links connecting the nodes to form a network topology. The network resource arbiter includes a path selection module to compute a set of currently available equal cost paths between the nodes in the network based on the network topology, a set of per-link network resource utilization indications, and a set of equal cost load spreading algorithms used at each of the nodes to determine path IDs corresponding to specific paths in the network. When an application running on a server intends to initiate a large flow transaction, for example, a distributed file system transaction, a content stream, a virtual machine migration, or a flow for which collisions with another significant flow could result in congestive loss in the network, the server sends a request to allocate network resources for the flow to the nearest edge network element in the network including the resource requirements, the source and destination information for the flow, and flow classification information. A load distribution module in the edge network element communicates the request to a network resource arbiter indicating the network resource arbiter can derive this information.

In block 302, a request to allocate network resources for a flow between a given source node and a given destination node is received at the network resource arbiter. The request includes a resource requirement for the flow. In block 304, the network resource arbiter selects a path from the currently available equal cost paths between the given source node and the given destination node that has sufficient available resources to satisfy the resource requirement of the flow. An equal cost path has sufficient available resources to satisfy the resource requirement of the flow if the unallocated resource value for each of the links in that equal cost path is greater than the resource requirement of the flow. In an alternative embodiment, a more complex constrained resource computation may be used. In one embodiment, the path selected is a least used path between the given source node and the given destination node.

When a path is selected, for each of the links in the path selected, a flow resource value or values representing the resource requirement of the flow is deducted from an unallocated resource value for that link to allocate the resource requirement to the flow. In block 308, an override path ID value that represents the path selected to be used by the nodes in the network to correctly perform multipath forwarding for the flow is determined. In block 310, the override path ID value that represents the path selected is communicated to the load distribution module. In addition to the override path ID value, either flow classification information or sufficient information to allow the load distribution module to correlate the override path ID value with flow classification information previously retained at the load distribution module is communicated to the load distribution module. This override path ID value from the network resource arbiter is to be inserted by the edge network element into subsequent frames belonging to the flow to be used in subsequent forwarding decisions to be made by nodes along the path selected.

Once the data transaction for the flow has completed, for example, when a time-to-live amount of time for the flow expires or a frame count for the flow reaches a predetermined count value after allocating the resource requirement for the flow, the unallocated resource value is increase by the flow resource value to de-allocate network resources for the flow. In other embodiments, to account for network latency and to prevent the flow assignment from expiring prematurely, the unallocated resource value for each of the links in the path selected is increased by the flow resource value after a buffer amount of time has elapsed since the time-to-live amount of time has expired, or after a buffer amount of time has elapsed since the frame count for the flow has reached the predetermined count value. In an alternative embodiment, the unallocated resource value for each of the links in the path selected is increased responsive to receiving from the load distribution module a request to release network resources allocated to the flow. In a further modification to any of the above embodiments, loss of communication between the load distribution module and the network resource arbiter may result in the release of the allocated resources in the database for all flows that are associated with that load distribution module.

Figure 4:
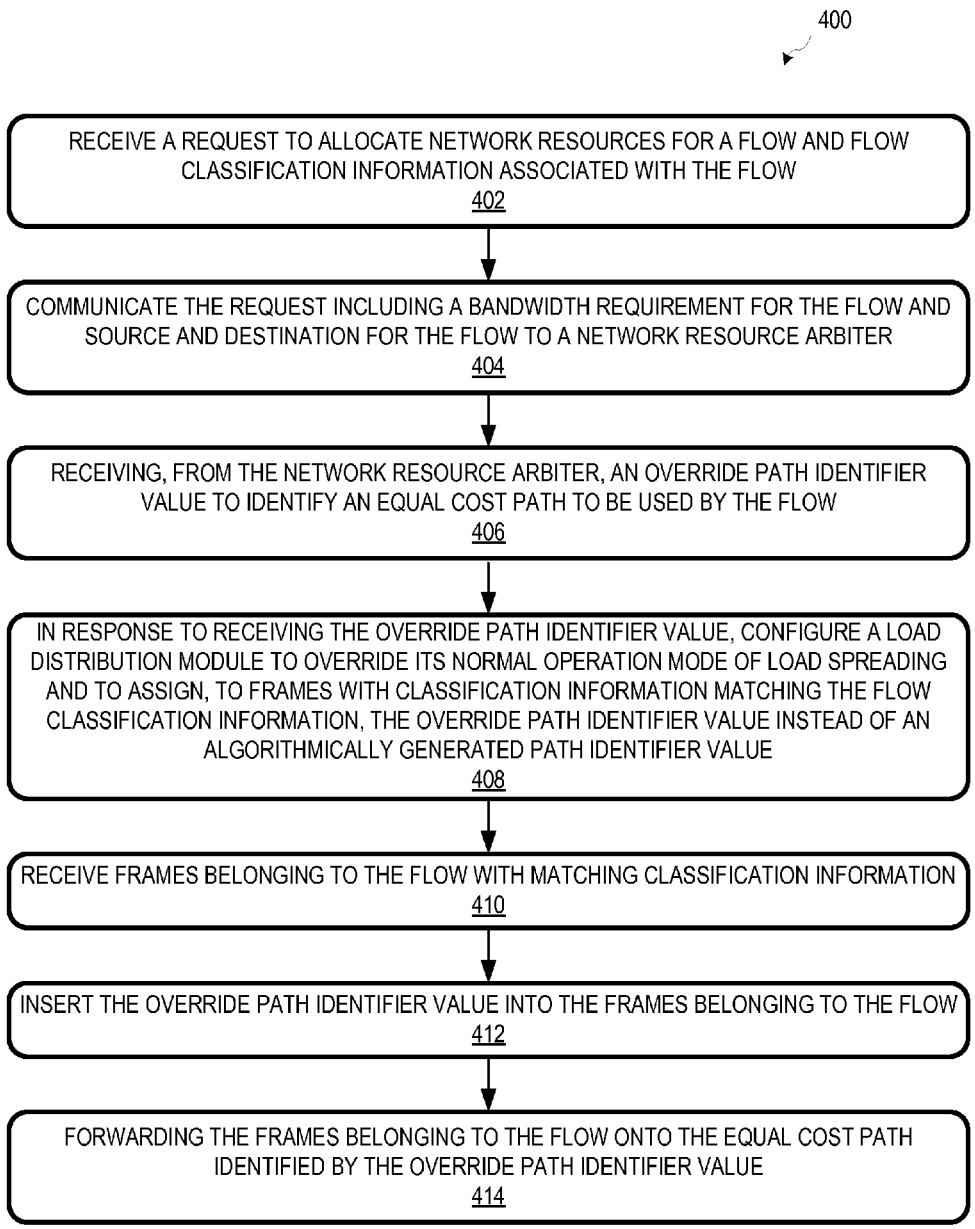
FIG. 4 illustrates a flow diagram of a method in an edge network element for load spreading according to one embodiment of the present invention.

FIG. 4 illustrates a method 400 in an edge network element for load spreading in a network according to one embodiment of the present invention. The edge network element includes a load distribution module with a default operation mode of load spreading that distributes load using an algorithmically generated path identifier value computed from frame header information. In block 402, a request to allocate network resources for a flow and flow classification information associated with the flow is received from an application running on a server. In block 404, the request including a resource requirement for the flow is communicated to a network resource arbiter. In block 406, an override path identifier value to identify an equal cost path to be used by the flow is received from the network resource arbiter. In response to receiving the override path identifier value, the load distribution module is configured to override its default operation mode of load spreading, and to assign the override path identifier value received from the network resource arbiter to frames with classification information matching the flow classification information instead of assigning the algorithmically generated path identifier value in block 408. In block 410, frames belonging to the flow with matching classification information are received at the edge network element. In block 412, the edge network element inserts the override path identifier value received from the network resource arbiter into the frames belonging to the flow. In block 414, the edge network element forwards the frames belonging to the flow onto the equal cost path identified by the override path identifier value received from the network resource arbiter.

Once the data transaction for the flow has completed, for example, when a time-to-live amount of time for the flow expires or a frame count for the flow reaches a predetermined count value after allocating the resource requirement for the flow, the override classification filter is removed and associated state reclaimed such that the algorithmically generated path identifier value computed from the frame header information is inserted into subsequently received frames instead of inserting the override path identifier received from the network resource arbiter. In other embodiments, to account for network latency and to prevent the flow assignment from expiring prematurely, the algorithmically generated path identifier value computed from the frame header information is inserted into subsequently received frames, instead of inserting the override path identifier received from the network resource arbiter, after a buffer amount of time has elapsed since the time-to-live amount of time has expired, or after a buffer amount of time has elapsed since the frame count for the flow has reached the predetermined count value. In an alternative embodiment, the algorithmically generated path identifier value computed from the frame header information is inserted into subsequently received frames, responsive to receiving from the load distribution module a request to release network resources allocated to the flow.

Figure 5A:
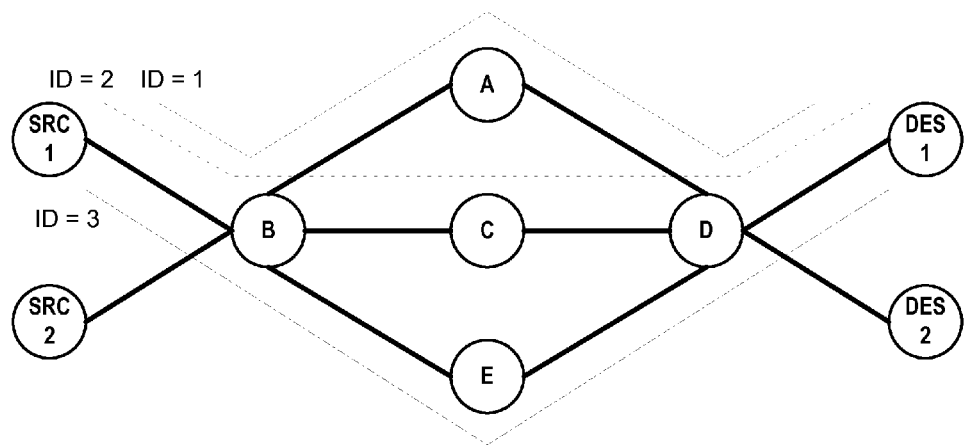
FIG. 5A illustrates a network topology with equal cost paths according to one embodiment of the present invention.
Figure 5B:
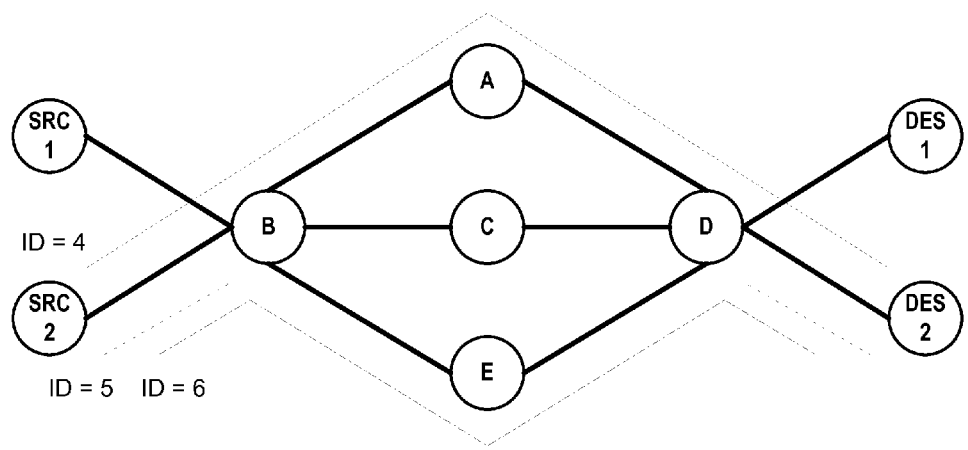
FIG. 5B illustrates a network topology with other equal cost paths according to one embodiment of the present invention.

By way of example, FIGS. 5A-B and FIGS. 6A-B illustrate the advantage of using a network resource arbiter for load spreading in an exemplary network according to one embodiment of the present invention. It should be understood that the network topology illustrated here is just one example of a network topology to aid the understanding of the present invention, and that embodiments of the present invention can be practiced with other network topologies. FIGS. 5A and 5B illustrate a simple network topology of an exemplary network with source nodes SRC1 and SRC2, destination nodes DES1 and DES2, and intermediate nodes A-E. There are three possible equal cost paths between SRC1 and DES1 as illustrated in FIG. 5A. The first path is the path SRC1-B-A-D-DES1 with a path ID value=1. The second path is the path SRC1-B-C-D-DES1 with a path ID value=2. The third path is the path SRC1-B-E-D-DES1 with a path ID value=3. There are also three possible equal cost paths between SRC2 and DES2 as illustrated in FIG. 5B. The first path is the path SRC2-B-A-D-DES2 with a path ID value=4. The second path is the path SRC2-B-C-D-DES2 with a path ID value=5. The third path is the path SRC2-B-E-D-DES2 with a path ID value=6. All links are initially unallocated to any flows, and all links have the same available network resources.

Figure 6A:
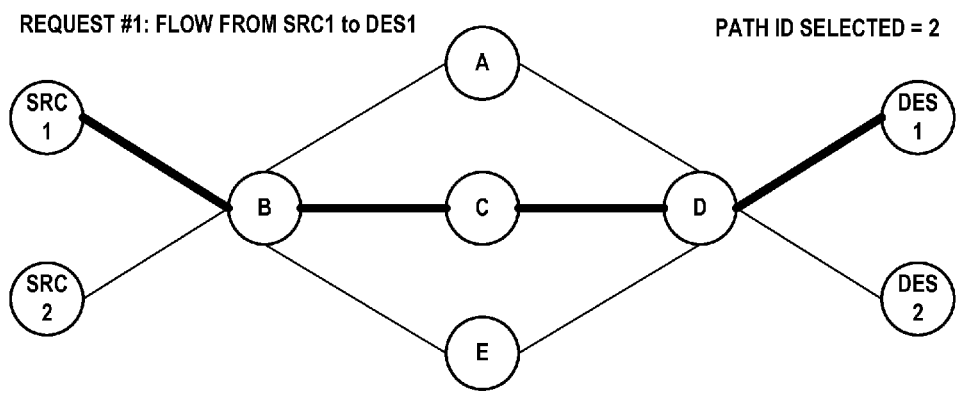
FIG. 6A illustrates a method of load spreading being performed in a network at one point in time according to one embodiment of the present invention.

In FIG. 6A, a first request to allocate network resources for a first flow between SRC1 and DES 1 is received. The resource requirement of the first flow as indicated in the first request can be satisfied by any of the equal cost paths with path ID value=1, 2, or 3. The network resource arbiter selects the path SRC1-B-C-D-DES1 with path ID value=2 as the path to be used by the first flow corresponding to the first request, and allocates the network resources on links along this path to the first flow. It should be noted that the network resource arbiter can alternatively select one of the other paths with path ID value=1 or 3, because these other paths can also satisfy the resource requirement of the first flow.

Figure 6B:
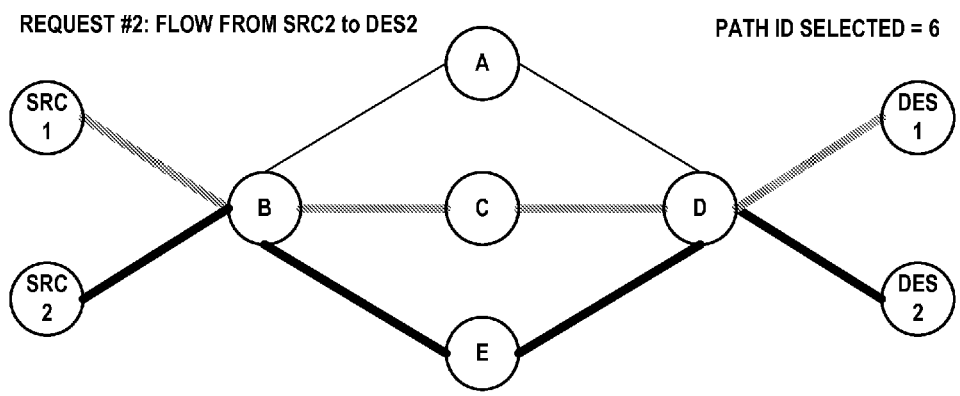
FIG. 6B illustrates a method of load spreading being performed in a network at another point in time according to one embodiment of the present invention.

In FIG. 6B, a second request to allocate network resources for a second flow between SRC2 and DES2 is received when the network resources along the path SRC1-B-C-D-DES1 are still allocated to the first flow. The resource requirement of this second flow as indicated in the second request can be satisfied by only the equal cost paths with path ID value=4 or 6, because the path with path ID value=5 has common links B-C and C-D that are shared with the path that is currently allocated to the first flow. If an uncoordinated pseudo-random algorithmic flow assignment is used at the local nodes, the path that this second flow may take may include links B-C and C-D to cause congestion on these links. An uncoordinated pseudo-random algorithmic flow assignment may select these links because these links are part of the set of equal cost paths that connect SRC2 with DES2, and an uncoordinated pseudo-random algorithmic flow assignment would be unaware that links B-C and C-D are currently being used by the first flow.

Instead of using an uncoordinated pseudo-random algorithmic flow assignment, the network resource arbiter according to embodiments of the present invention selects the path with path ID value=6 as the path to be used by the second flow to avoid congestion on links B-C and C-D because the network resource arbiter is aware that links B-C and C-D are currently being used by the first flow and that these links cannot accommodate the resource requirement of the second flow. It should be noted that the network resource arbiter can alternatively select the path with path ID value=4 instead. Hence, embodiments of the present invention is able to manage large flows in a network in order to avoid congestion by using a network resource arbiter to assign flows instead of relying on an uncoordinated pseudo-random algorithmic flow assignment.

Figure 7:
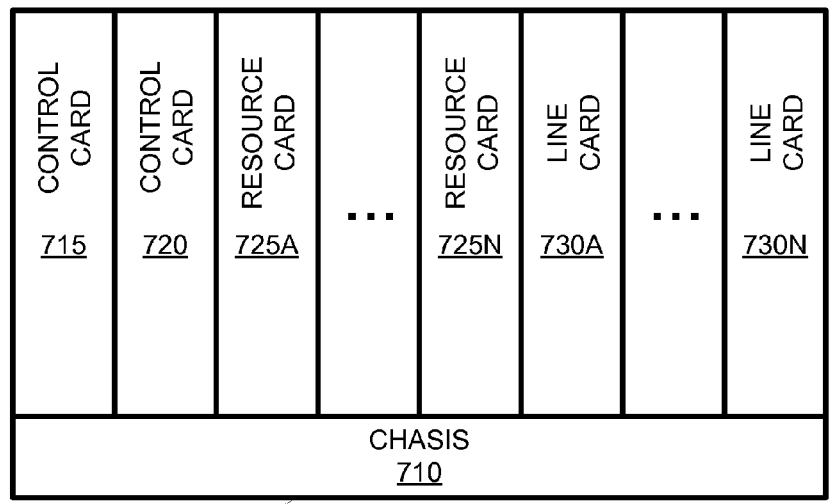
FIG. 7 illustrates a network element according to one embodiment of the invention.

FIG. 7 illustrates an exemplary network element used in some embodiments of the invention. As illustrated in FIG. 7, the network element 700 includes the control cards 715 and 720 (e.g., one control card is active the other is a backup), the resource cards 725A-725N, and the line cards 730A-730N. These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms. It should be understood that the architecture of the network element 700 illustrated in FIG. 7 is exemplary, and different combinations of cards may be used in other embodiments of the invention. For example, some network elements may include a set of one or more control cards, a set of zero or more resource cards, and a set of one or more line cards. In one embodiment, any of the network elements may have an architecture similar to that as illustrated in FIG. 7.

Figure 8:
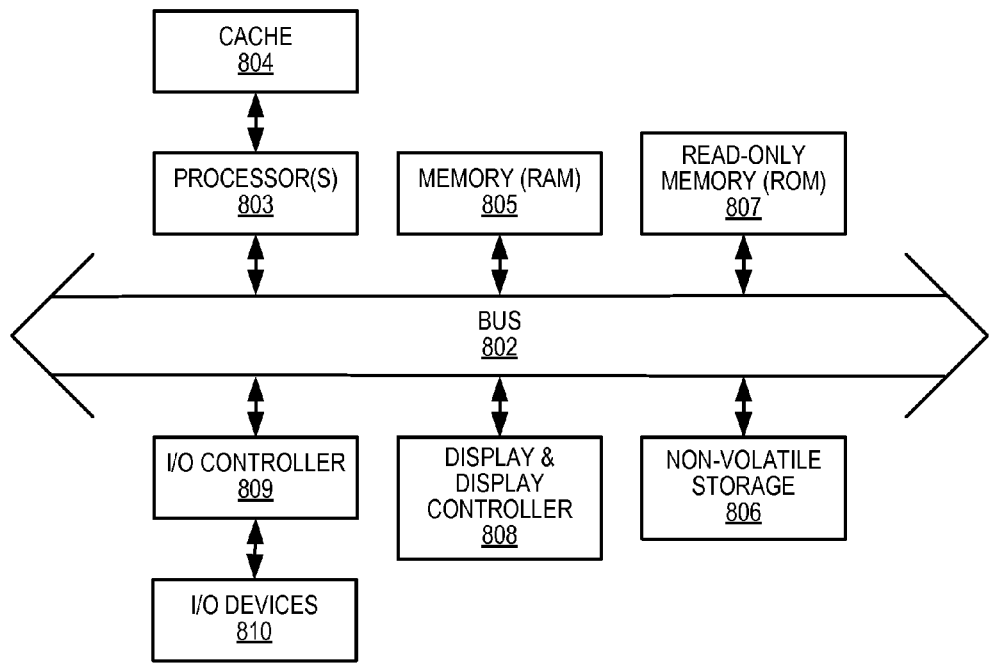
FIG. 8 illustrates a line/control card in a network element according to one embodiment of the invention.

Each of the cards illustrated in FIG. 7 may include one or more processors and one or more memories as shown in FIG. 8. For example, the line cards 730A-730B typically include one or more packet processing units to process packets including forwarding and/or switching packets at high speed, and include one or more memories to store a one or more MAC address tables described herein. The control cards 715 and 720 also include one or more processors 803 to perform signaling, routing (including creation of and/or management of MAC address tables), connection setup, session setup, etc. For example, among other things, the control card 715 executes instructions stored in memory (e.g., cache 804, RAM 805, ROM 807, or non-volatile storage 806) to execute the learning and forwarding modules described herein. As described herein, instructions may refer to specific configurations of hardware such as application specific integrated circuits (ASICs) configured to perform certain operations or having a predetermined functionality or software instructions stored in memory embodied in a non-transitory computer readable medium.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network resource arbiter for load spreading in a network having a set of nodes and links connecting the set of nodes to form a network topology, the method comprising the steps of:
   receiving, at the network resource arbiter from an edge network element, a request to allocate network resources for a flow between a given source node and a given destination node, wherein the request includes a resource requirement for the flow, and wherein the request contains a flow classification information indicating the flow being a large flow;
   selecting a path from the currently available equal cost paths between the given source node and the given destination node that has sufficient available resources to satisfy the resource requirement of the flow;
   determining a path identifier value that represents the path selected to be used to route the flow between the given source node and the given destination node via nodes along the path between the given source node and the given destination node, wherein the path identifier value is added; and
   communicating, to the edge network element, the path identifier value that represents the path selected, wherein the path identifier value is to be inserted by the edge network element into subsequent frames belonging to the flow to be used in subsequent forwarding decisions to be made by the nodes along the path selected based on the path identifier value.

2. The method of claim 1, further comprising the steps of:
   for each of the links in the path selected:
      deducting a flow resource value representing the resource requirement of the flow from an unallocated resource value for that link to allocate the resource requirement to the flow; and
      responsive to a time-to-live amount of time for the flow expiring or a frame count for the flow reaching a predetermined count value after allocating the resource requirement for the flow, increasing the unallocated resource value by the flow resource value.

3. The method of claim 2, wherein the unallocated resource value for each of the links in the path selected is increased by the flow resource value after a buffer amount of time has elapsed since the time-to-live amount of time has expired, or after the buffer amount of time has elapsed since the frame count for the flow has reached the predetermined count value.

4. The method of claim 1, further comprising the steps of:
   for each of the links in the path selected:
      deducting a flow resource value representing the resource requirement of the flow from an unallocated resource value for that link to allocate the resource requirement to the flow; and
      responsive to receiving, at the network resource arbiter from the edge network element, a request to release network resources allocated to the flow, increasing the unallocated resource value by the flow resource value.

5. The method of claim 1, wherein the path identifier value is one of a flow ID, an entropy label, a multi-topology identifier, and an encoded multipath identifier in a frame.

6. The method of claim 1, wherein an equal cost path has sufficient available resource to satisfy the resource requirement of the flow if the unallocated resource value for each of the links in that equal cost path is greater than the resource requirement of the flow.

7. The method of claim 1, wherein the path selected is a least used path between the given source node and the given destination node.

8. A method in an edge network element for load spreading in a network, the method comprising the steps of:
   receiving a request to allocate network resources for a flow and flow classification information associated with the flow;
   communicating the request including a resource requirement for the flow to a network resource arbiter upon the request containing a flow classification information indicating the flow being a large flow;
   receiving, from the network resource arbiter, an override path identifier value to identify an equal cost path to be used by the flow;
   in response to receiving the override path identifier value, configuring a load distribution module of the edge network element to override its default operation mode of load spreading and to assign, to frames with classification information matching the flow classification information, the override path identifier value received from the network resource arbiter instead of an algorithmically generated path identifier value;
   receiving frames belonging to the flow with matching classification information;
   inserting the override path identifier value received from the network resource arbiter into the frames belonging to the flow; and forwarding the frames belonging to the flow onto the equal cost path identified by the override path identifier value received from the network resource arbiter, wherein nodes along the identified equal cost path by the override path identifier value forward the frames according to the override path identifier.

9. The method of claim 8, further comprising the steps of:
responsive to a time-to-live amount of time for the flow expiring or a frame count for the flow reaching a predetermined count value:
inserting the algorithmically generated path identifier value computed from the frame header information into subsequently received frames, instead of inserting the override path identifier received from the network resource arbiter.

10. The method of claim 9, wherein the algorithmically generated path identifier value computed from frame header information is inserted into the subsequently received frames after a buffer amount of time has elapsed since the time-to-live amount of time has expired or the buffer amount of time has elapsed since the frame count for the flow has reached the predetermined value.

11. The method of claim 8, further comprising the steps of:
responsive to receiving a request to release network resources for the flow:
inserting the algorithmically generated path identifier value computed from the frame header information into subsequently received frames, instead of inserting the override path identifier received from the network resource arbiter.

12. The method of claim 8, wherein the override path identifier value is one of a flow ID, an entropy label, a multi-topology identifier, and an encoded multipath identifier in a frame.

13. A network element serving as a network resource arbiter for arbitrating network resources in a network having a set of nodes and links connecting the set of nodes in a network topology of the network, the network element comprising:
a set of memory configured to store,
a topology database to store the network topology of the network and a set of per-link network resource utilization indications for each of the links in the network, wherein each of the per-link network resource utilization indications include an unallocated resource value for each link,
a load spreading algorithm database to store a set of equal cost load spreading algorithms that are used at each node, and
a path selection module coupled to the topology database and the load spreading algorithm database; and
a set of one or more processors configured to execute the path selection module that is configured to:
compute a set of currently available equal cost paths between the nodes in the network based on the network topology, the set of per-link network resource utilization indications, and the set of equal cost load spreading algorithms;
select, in response to a request to allocate network resources for a flow, a path from the set of currently available equal cost paths that has sufficient available resource to satisfy a resource requirement of the flow, wherein the request contains a flow classification information indicating the flow being a large flow; and
determine an override path identifier value that represents the path selected to be used to route the flow between a given source node and a given destination node via nodes along the path between the given source node and the given destination node, wherein the override path identifier value is to be inserted into frames belonging to the flow to be used in subsequent forwarding decisions to be made by the nodes along the path based upon the override path identifier value.

14. The network element of claim 13, wherein the path selection module is further configured to, for each of the links in the path selected:
deduct a flow resource value representing the resource requirement of the flow from the unallocated resource value in the topology database corresponding to that link to allocate the resource requirement to the flow; and
responsive to a time-to-live amount of time for the flow expiring or a frame count for the flow reaching a predetermined count value after allocating the resource requirement for the flow, increase the unallocated resource value in the topology database by the flow resource value.

15. The network element of claim 13, wherein the path selection module is further configured to increase the unallocated resource value for each of the links in the path selected by the flow resource value of the flow after a buffer amount of time has elapsed since the time-to-live amount of time has expired or the buffer amount of time has elapsed since the frame count for the flow has reached the predetermined count value.

16. The network element of claim 13, wherein the path selection module is further configured to, for each of the links in the path selected:
deduct a flow resource value representing the resource requirement of the flow from the unallocated resource value in the topology database corresponding to that link to allocate the resource requirement to the flow; and
responsive to receiving a request to release network resources for the flow, increase the unallocated resource value in the topology database by the flow resource value.

17. The network element of claim 13, wherein the path identifier value is one of a flow ID, an entropy label, a multi-topology identifier, and an encoded multipath identifier in a frame.

18. The network element of claim 13, wherein an equal cost path has sufficient available resource to satisfy the resource requirement of the flow if the unallocated resource value for each of the links in that equal cost path is greater than the resource requirement of the flow.

19. The network element of claim 13, wherein the path selected is a least used path between the source node and destination node.

20. An edge network element, comprising:
a set of one or more memory configured to store code; and
a set of one or more processors configured to execute the code, the code including:
a load distribution module comprising:
a path identifier generator configured to algorithmically compute a path identifier value from frame header information of received frames; and
a flow filter configured to:
select, as a frame path identifier value, between the algorithmically computed path identifier value generated by the path identifier generator, and an override path identifier value received from a network resource arbiter that identifies an equal cost path to be used by a flow; and
insert the frame path identifier value selected into the received frames; and a forwarding module configured to forward the received frames based on the frame path identifier value selected.

21. The edge network element of claim 20, wherein the flow filter is configured to select the algorithmically computed path identifier value generated by the path identifier generator after a time-to-live amount of time for the flow has expired or a frame count for the flow has reached a predetermined count value.

22. The edge network element of claim 21, wherein the flow filter is configured to select the algorithmically computed path identifier value generated by the path identifier generator after a buffer amount of time has elapsed since the time-to-live amount of time for the flow has expired or since the frame count for the flow has reached the predetermined count value.

23. The edge network element of claim 20, wherein the flow filter is configured to select the algorithmically computed path identifier value generated by the path identifier generator in response to receiving a request to release network resources for the flow.

24. The edge network element of claim 20, wherein the path identifier value is one of a flow ID, an entropy label, a multi-topology identifier, and an encoded multipath identifier in a frame.

* * * * *